United States Patent
Ireland et al.

(10) Patent No.: US 9,704,125 B2
(45) Date of Patent: Jul. 11, 2017

(54) MULTI-LEVEL DISTRIBUTION PLANNING

(71) Applicant: ORACLE INTERNATIONAL CORPORATION, Redwood Shores, CA (US)

(72) Inventors: Ashley V. Ireland, Roswell, GA (US); Lisa M. Smith, Woodbury, MN (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 492 days.

(21) Appl. No.: 14/105,384

(22) Filed: Dec. 13, 2013

(65) Prior Publication Data

US 2015/0168947 A1    Jun. 18, 2015

(51) Int. Cl.
| | |
|---|---|
| G06Q 30/00 | (2012.01) |
| G06Q 10/00 | (2012.01) |
| G06Q 10/08 | (2012.01) |
| G06Q 10/06 | (2012.01) |

(52) U.S. Cl.
CPC ..... *G06Q 10/087* (2013.01); *G06Q 10/06315* (2013.01); *Y02P 90/02* (2015.11)

(58) Field of Classification Search
USPC .......................................................... 705/28
See application file for complete search history.

(56) References Cited

U.S. PATENT DOCUMENTS

| | | | | |
|---|---|---|---|---|
| 6,937,992 B1* | 8/2005 | Benda | ................... | G06Q 10/04 705/28 |
| 6,980,885 B2* | 12/2005 | Ye | ....................... | G06Q 10/047 700/215 |
| 7,552,066 B1* | 6/2009 | Landvater | ........ | G06Q 10/06315 705/7.25 |
| 8,086,344 B1* | 12/2011 | Mishra | ................. | G06Q 10/087 700/214 |
| 8,600,821 B2* | 12/2013 | Borders | ............. | G06Q 10/0631 705/26.1 |
| 9,174,758 B1* | 11/2015 | Rowley | ................... | B65B 59/00 |
| 2002/0019759 A1* | 2/2002 | Arunapuram | .......... | G06Q 10/04 705/7.26 |

(Continued)

FOREIGN PATENT DOCUMENTS

DE    WO 2010006726 A1 *    1/2010    .......... G01C 21/343

*Primary Examiner* — Ashford S Hayles
(74) *Attorney, Agent, or Firm* — Cooper Legal Group, LLC (57) ABSTRACT

Systems and methods are described herein that provide multi-level distribution planning utilizing simplified inventory movements to simplify the distribution planning process for inventory movements that include cross-docking while identifying cross-docked inventory to the cross-dock locations to prevent unnecessary handling. A simplified inventory movement is constructed that represents a multi-level route as a single movement from source to destination with an associated lead time that includes all time-related factors that arise in moving the inventory from the source through the cross-dock locations to the destination. The simplified inventory movement is provided to distribution planning solutions and the distribution planning solutions treat the multi-level route in the same manner as a single level route having the same source, destination, and lead time. This simplifies the distribution planning process and prevents the inventory from being re-allocated by the distribution planning solutions.

19 Claims, 7 Drawing Sheets

(56) References Cited

U.S. PATENT DOCUMENTS

| | | | |
|---|---|---|---|
| 2002/0138358 A1* | 9/2002 | Scheer | G06Q 10/063 705/7.36 |
| 2002/0156663 A1* | 10/2002 | Weber | G06Q 10/04 705/7.26 |
| 2003/0009361 A1* | 1/2003 | Hancock | G06Q 10/06312 709/219 |
| 2003/0172007 A1* | 9/2003 | Helmolt | G06Q 10/087 705/28 |
| 2004/0084527 A1* | 5/2004 | Bong | G06Q 10/087 235/385 |
| 2004/0178126 A1* | 9/2004 | Shah | G06Q 10/083 209/1 |
| 2005/0149373 A1* | 7/2005 | Amling | G06Q 10/08 705/28 |
| 2005/0228705 A1* | 10/2005 | Irwin | G06Q 10/08 705/7.19 |
| 2005/0246192 A1* | 11/2005 | Jauffred | G06Q 10/047 705/338 |
| 2006/0206235 A1* | 9/2006 | Shakes | G06Q 10/08 700/216 |
| 2006/0224423 A1* | 10/2006 | Sun | G06Q 10/04 705/7.12 |
| 2006/0241990 A1* | 10/2006 | Sun | G06Q 10/04 705/7.26 |
| 2007/0136079 A1* | 6/2007 | Beykirch | G06Q 10/08 705/338 |
| 2007/0192111 A1* | 8/2007 | Chasen | G06Q 10/08 705/335 |
| 2008/0010357 A1* | 1/2008 | Ye | G06Q 10/08 709/207 |
| 2008/0189236 A1* | 8/2008 | Foster | G06Q 10/08 |
| 2008/0306795 A1* | 12/2008 | Ho | G06Q 10/047 705/7.26 |
| 2009/0037234 A1* | 2/2009 | Gabrielson | G06Q 10/025 705/6 |
| 2009/0094087 A1* | 4/2009 | Chung | G06Q 10/063 705/7.11 |
| 2009/0150208 A1* | 6/2009 | Rhodes | G06Q 10/0631 705/7.12 |

\* cited by examiner

| Day | 1 | 2 | 3 | 4 | 5 | 6 | 7 | 8 | 9 | 10 |
|---|---|---|---|---|---|---|---|---|---|---|
| WH Lead Time | 3 | | | 3 | | | 3 | | | 3 |
| Processing Time | 1 | 1 | 1 | 1 | 1 | 1 | 1 | 1 | 1 | 1 |
| Max Hold Time | 1 | 1 | 1 | 1 | 1 | 1 | 1 | 1 | 1 | 1 |
| Store Lead Time | | 1 | 1 | 1 | 1 | 1 | 1 | 1 | 1 | 1 |
| Receipt Plan | | | | | | 5 | 6 | | 5 | 6 |

1. Source - Warehouse: 3     2. Warehouse – Store: 2

Source - Store: 5

FIG. 5

| Source | Destination | Qty | Required Release Day | Traditional Release Day | Delivery Day | Transaction ID | Linked To |
|---|---|---|---|---|---|---|---|
| Vendor | Warehouse | 12 | Tuesday | Tuesday | Thursday | PO1 | |
| Warehouse | Store 1 | 5 | Tuesday | Thursday | Friday | TX1 | PO 1 |
| Warehouse | Store 2 | 7 | Tuesday | Thursday | Friday | TX2 | PO 1 |

MULTI-LEVEL DISTRIBUTION PLANNING

BACKGROUND

Distribution planning systems coordinate inventory movements to supply goods through a supply chain. When inventory moves through intermediate nodes when traveling from source to destination (i.e., "cross-docking), distribution planning becomes more complicated as multiple levels of movements must be coordinated. Further, warehouses may treat shipments of goods that are simply being cross-docked at the warehouse in the same manner as goods that are to be stocked or unpacked and distributed to destinations from the warehouse. This results in the warehouse unpacking and stocking goods that could have remained in the original pack configuration for shipment to their ultimate destination.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

The goal of distribution planning is to plan a series of coordinated inventory movements such that a discrete quantity of inventory can be moved from a source to a destination to fill demand for the inventory in a timely manner. Cross-docking of inventory introduces many challenges to the distribution planning process. When the individual levels or legs of the inventory's route from source to destination are considered as individual movements by various distribution planning solutions, such as replenishment solutions, the complexity of planning increases significantly. Further, if the planning solutions consider each level as an insular movement, the cross-docked inventory may be re-routed to fill another demand, resulting in difficulties in planning inventory movements that include cross-docking. When inventory is cross-docked at one or more intermediate locations, it is desirable that when the inventory arrives at the intermediate location, the inventory is deemed not available for any purpose other than its intended next downstream location. This prevents the warehouse from needlessly unpacking and re-packing the shipment or using inventory in the shipment to fill demand at other destinations.

Systems and methods are described herein that provide multi-level distribution planning utilizing simplified inventory movements to simplify the distribution planning process for inventory movements that include cross-docking. The systems and methods described herein identify cross-docked inventory to the cross-dock locations to prevent unnecessary handling. This is accomplished by constructing a simplified inventory movement that represents a multi-level route as a single movement from source to destination with an associated lead time that includes all time-related factors that arise in moving the inventory from the source through the cross-dock locations to the destination. In this manner, time-phased factors are considered when constructing the simplified inventory movement and any specific delays (e.g., holidays, and so on) can be included in the lead time associated with the simplified inventory movement.

The simplified inventory movement is an elegant way of describing inventory movements from source to destination that pass through cross-dock locations. The simplified inventory movement is provided to distribution planning solutions. The distribution planning solutions treat the multi-level route in the same manner as a single level route having the same source, destination, and lead time. This greatly simplifies the distribution planning process and prevents the inventory from being re-allocated by the distribution planning solutions.

When the inventory is set to leave the source, a set of transactions is created for the simplified inventory movement, with each transaction corresponding to a level of the actual route (including cross-docked locations) and being linked to its specific source and specific destination. The set of transactions are linked together via an electronic document that is associated with the inventory. This linking of transactions notifies the cross-dock locations that the inventory for a given outgoing shipment is reliant upon a specific inbound arrival of the inventory.

Figure 1:
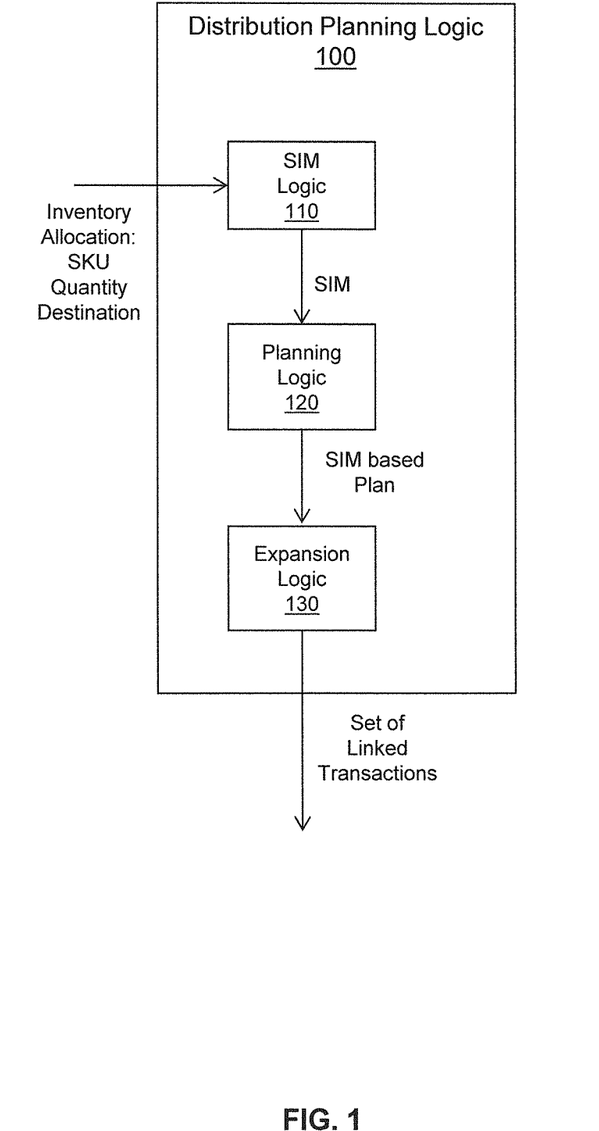
FIG. 1 illustrates one example embodiment of an inventory planning system that uses simplified inventory movements.

With reference to FIG. 1, one embodiment of a multi-level distribution planning logic 100 that uses simplified inventory movements is illustrated. The distribution planning logic 110 inputs an inventory allocation that includes a stock-keeping unit (SKU) that identifies items, a quantity of items, a source, and a destination. The source may be a vendor or warehouse and the destination may be a store. The multi-level distribution planning logic 100 outputs a set of linked transactions that correspond to legs of a multi-level route through which the quantity of items moves to the destination. The linked transactions may be in the form of an electronic document that links each leg of the route to its individual source and destination. The multi-level distribution planning logic 100 uses simplified inventory movements to simplify planning.

The multi-level distribution planning logic 100 includes a simplified inventory movement (SIM) logic 110, a planning logic 120, and an expansion logic 130. The SIM logic 110 is configured to construct a simplified inventory movement from a multi-level route that includes cross-docking. The SIM logic 110 is configured to identify an inventory movement for a quantity of items from a source to a destination that includes at least one cross-dock location. The SIM logic 110 determines a simplified inventory movement that includes the source and the destination with an associated lead time. The lead time corresponds to the sum of any cross-dock-related delay time and any destination-related delay time.

In one embodiment, a user is prompted to input the multi-level route including a source, cross-dock location(s), and destination. The user also inputs a delay time for each cross-dock location and a delay time for the destination. A maximum holding time for each cross-dock location may also be input. The SIM logic 110 constructs the simplified inventory movement by adding time delays caused by the cross-dock location(s) to delay times for the destination. Examples of delay times include lead time, processing time, and maximum hold time.

Lead time is the amount of time that it takes for inventory to travel to a cross-dock location or destination from its immediate source. Processing time is defined by day of week for each cross-dock location. Processing time is the number of days after the day of delivery that the received inventory becomes available to ship. A value of zero for processing time indicates that the product is available to ship on the same day it is received. A value of one for processing time indicates that the product is available to be shipped the day after receipt and so on.

Maximum holding time is defined by day of week for each intermediate warehouse. The holding time starts on the day that a delivery becomes available (after processing time) and represents the maximum number of days after processing time has ended that inventory must be shipped out of the location to still be considered cross-docked. A value of zero indicates the inventory must ship out the same day it becomes available. A value of 1 indicates the inventory can ship out the same day or 1 day after it is available and so on.

The SIM logic aggregates the delay times for the cross-dock location(s) and the destination. The result is a simplified inventory movement for the quantity of items (as identified by SKU) that includes the source and destination (without cross-dock locations) and the aggregated delay times. Maximum holding times are also aggregated with the processing and lead times. An example of how delay times are aggregated will be described below with reference to FIG. 5.

The simplified inventory movement may be stored for later use when the same multi-level route will be used to ship inventory. The simplified inventory movement may be mapped to the source, cross-dock location(s), and destination or to a combination of the SKU, source, cross-dock location(s), and destination. When a new inventory allocation is received by the distribution planning logic 100, the simplified inventory movement can be retrieved from memory based on the source, cross-dock location(s), and destination and, optionally, SKU.

The simplified inventory movement is provided to a planning logic 120 that is configured to plan inventory movements for the quantity of items based on the simplified inventory movement. The planning logic 120 plans the inventory movements for the quantity of items in the same manner as when the inventory movement does not include the cross-dock location. The planning logic 120 may be a replenishment solution that allocates inventory and coordinates inventory movements for many sources, cross-dock locations, and destinations. The planning logic 120 may be a reconciliation process that reconciles receipts at the cross-dock locations. In one embodiment, the planning logic 120 responds to the simplified inventory movement by releasing the quantity of items at the cross-dock location at the same time the quantity of items is released from the source.

The planning logic 120 may be a receipt plan calculation engine that calculates receipt plans for the destination based on the lead time associated with the simplified inventory movement. The receipt plan is output against the destination and the receipt plan viewable at the cross-dock locations will not include receipts for cross-docked inventory having a simplified inventory movement.

The use of simplified inventory movements results in accurate planning because when cross-docking, the cross-dock location (e.g., warehouse) is only a pass-through location so all inventory that comes in must go out and all inventory is pre-distributed to the destinations at the point the purchase order or transfer is executed for the original source. As a pass through location that has no opportunity to re-distribute inventory, there is no reason to order safety stock at the warehouse. It also means that the cross-dock warehouse has no inventory that is unspoken for. Because of these conclusions the distribution planning system can assume that what the warehouse orders is a sum of the destinations' needs—no more, and no less.

Because the intermediate warehouse has no impact on the quantity that is ordered from the originating source it is safe to plan the receipts as if the intermediate warehouses were not a part of the equation. For the purposes of planning, the intermediate warehouse(s) impact the total lead time to the final destination but all other setup and planning acts as if the intermediate warehouses are not there. This ensures that receipt quantities at the final destination are not reconciled.

The planning logic 120 outputs a SIM-based plan that was determined based on the simplified inventory movement. After the plan is complete and the inventory movement is ready for execution, the expansion logic 130 expands the simplified inventory movement between the originating source and final destination to each of the physical legs between the source, intermediate warehouses, and the final destination. Each physical leg has a corresponding transaction and the transactions are electronically linked so that, at the cross-dock location, the quantity of items for the second shipment is satisfied from the first shipment. An example set of linked transactions for a simplified inventory movement is described with respect to FIG. 6.

Figure 2:
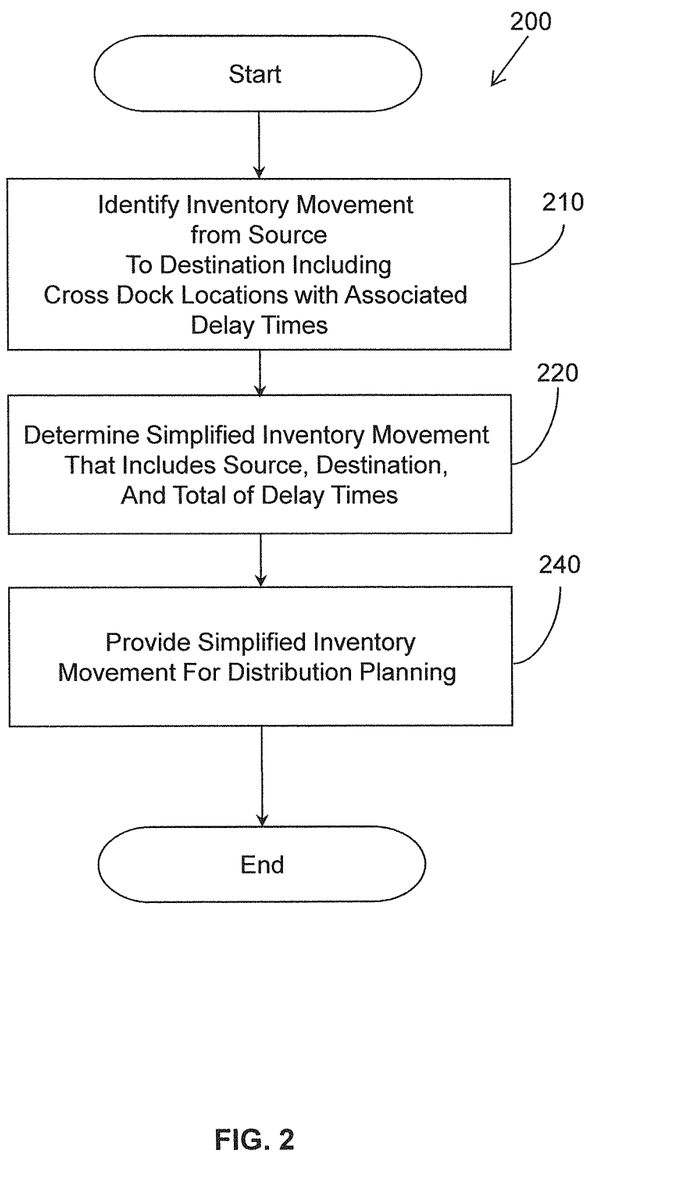
FIG. 2 illustrates one example embodiment of a method of constructing a simplified inventory movement.
Figure 5:
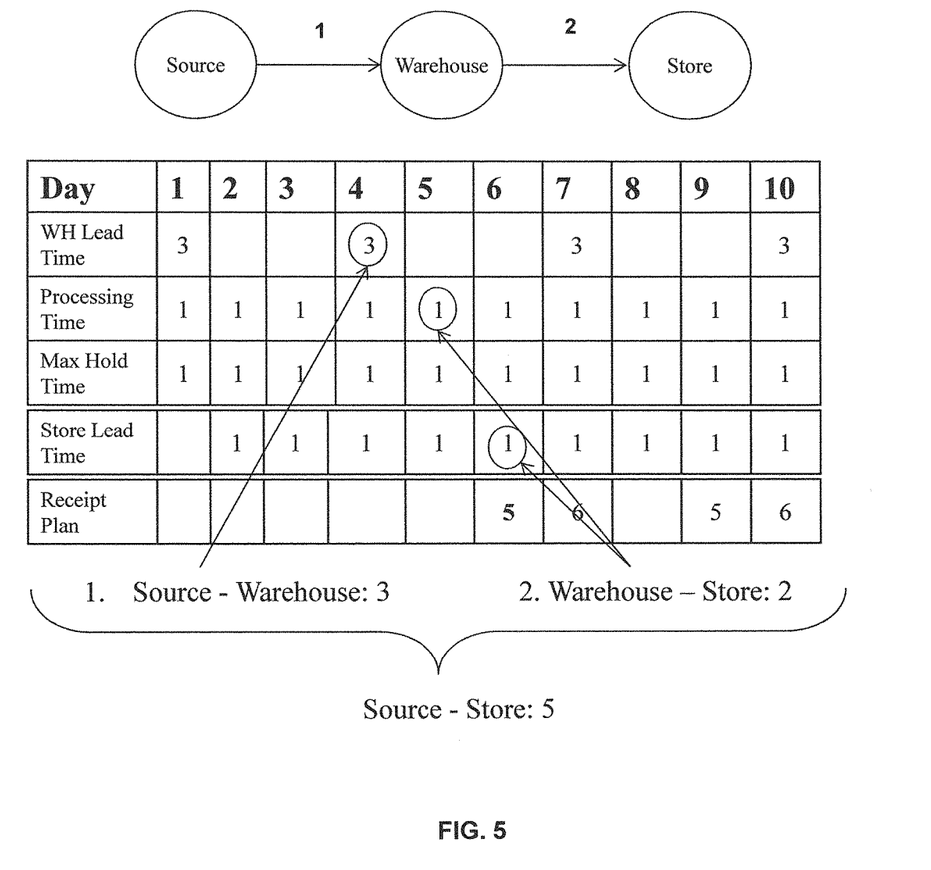
FIG. 5 illustrates an example of a simplified inventory movement.

FIG. 2 illustrates an example embodiment of a method 200 that creates a simplified inventory movement. The method 200 may be performed by the SIM logic 110 of FIG. 1. An example of the method is illustrated in FIG. 5. At 210, the method 200 includes identifying an inventory movement for a quantity of items from a source to a destination that includes at least one cross-dock location. The cross-dock location has an associated cross-dock delay time and the destination has an associated destination delay time. At 220, the method includes determining a simplified inventory movement that includes the source and the destination with an associated lead time, where the lead time corresponds to the sum of the cross-dock delay time and the destination delay time. At 230, the simplified inventory movement is provided to a distribution planning process. The distribution planning process plans inventory movements for the quantity of items in the same manner as when the inventory movement does not include the cross-dock location.

In one embodiment, the method 200 includes aggregating a cross-dock lead time, a cross-dock processing time, and a destination lead time to determine the lead time for the simplified inventory movement. In one embodiment the cross-dock delay time includes a maximum hold time associated with the cross-dock location. In one embodiment, the method 200 includes retrieving a stored simplified inventory movement mapped to the source, the cross-dock location, and the destination.

Figure 3:
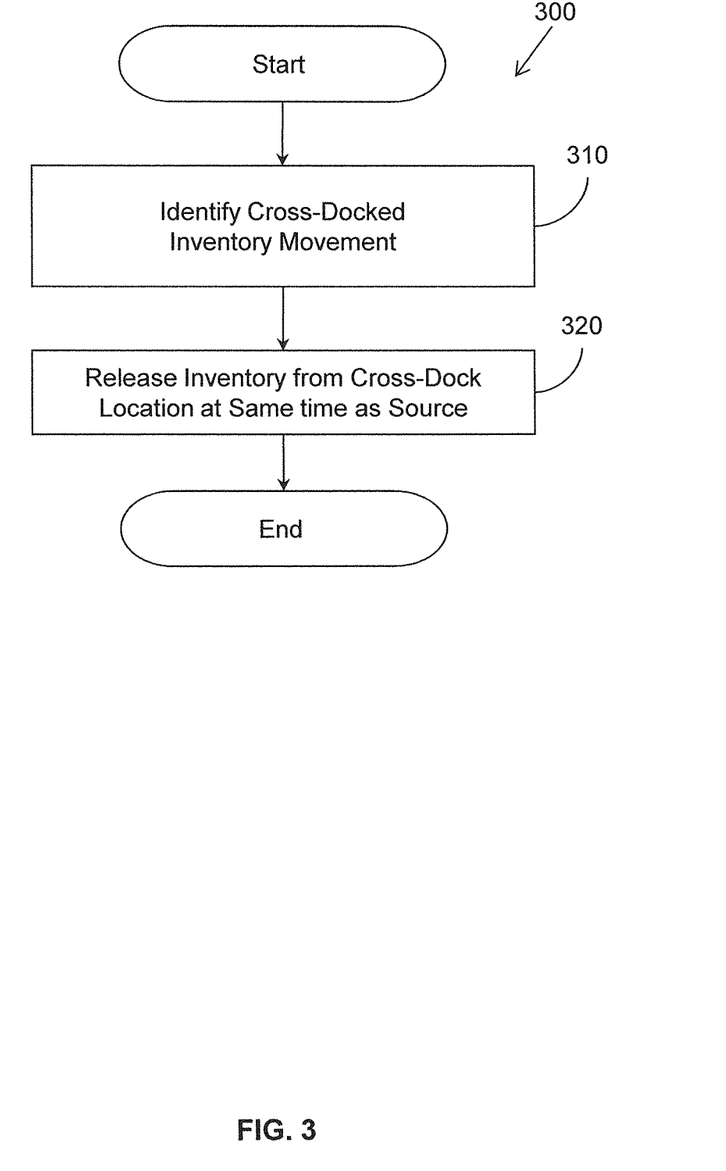
FIG. 3 illustrates one example embodiment of a method of performing inventory planning using a simplified inventory movement.
Figure 6:
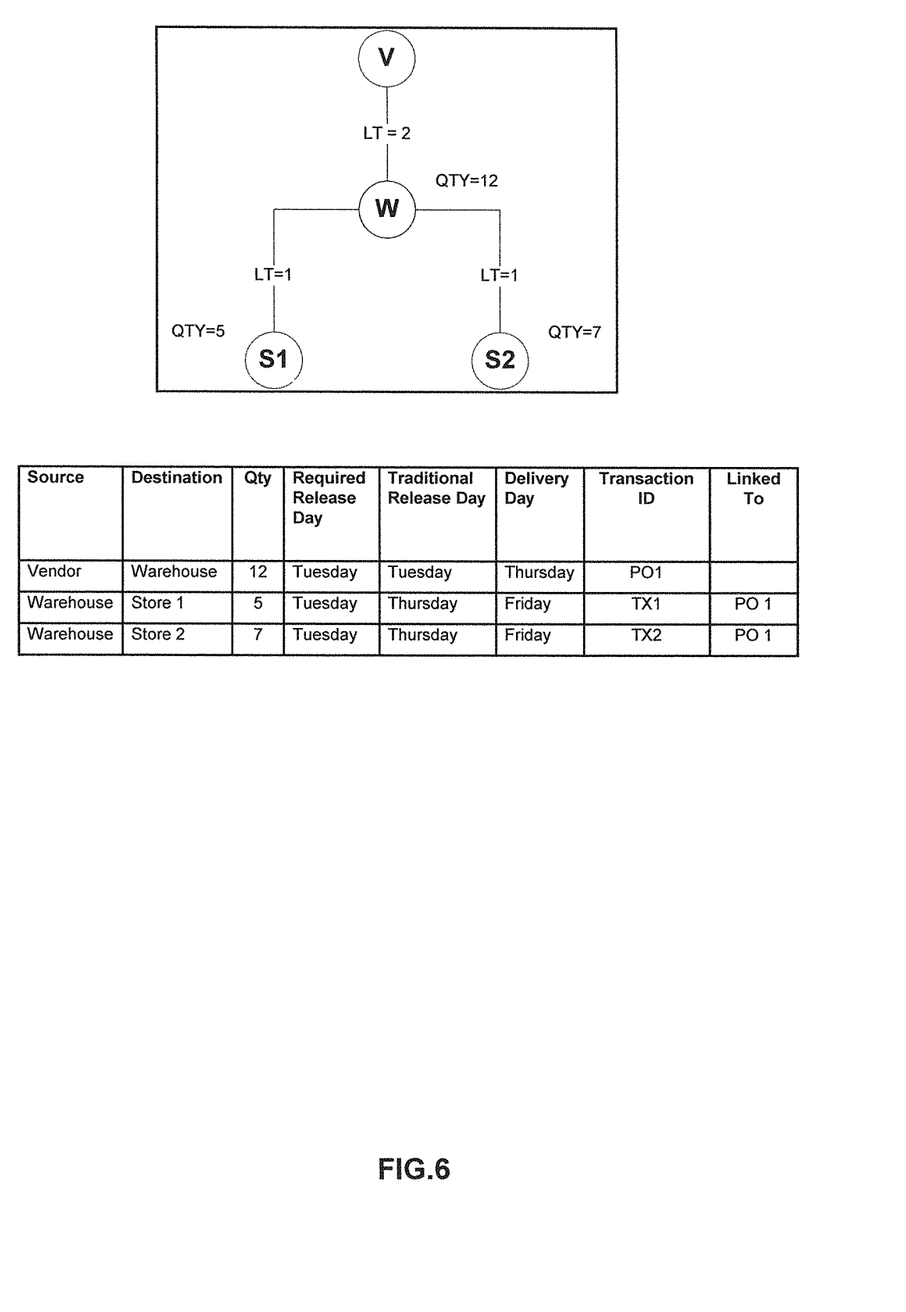
FIG. 6 illustrates an example of linked transactions for a simplified inventory movement.

FIG. 3 illustrates an example embodiment of a method 300 that performs distribution planning based on a simplified inventory movement. The method 300 may be performed by the planning logic 120 of FIG. 1. An example of the method is illustrated in FIG. 6. At 310, the method 300 includes identifying an inventory movement of a quantity of items that includes a first shipment of the quantity of items from a source to a cross-dock location and a second shipment of the quantity of items from the cross-dock location to a destination. At 320, the method includes, for distribution planning purposes, releasing the quantity of items at the cross-dock location at the same time the quantity of items is released at the source. In one embodiment, the method 300 includes creating a receipt plan for the cross-dock location that does not include the quantity of goods. In one embodiment the distribution planning process is prevented from altering the quantity of items.

Figure 4:
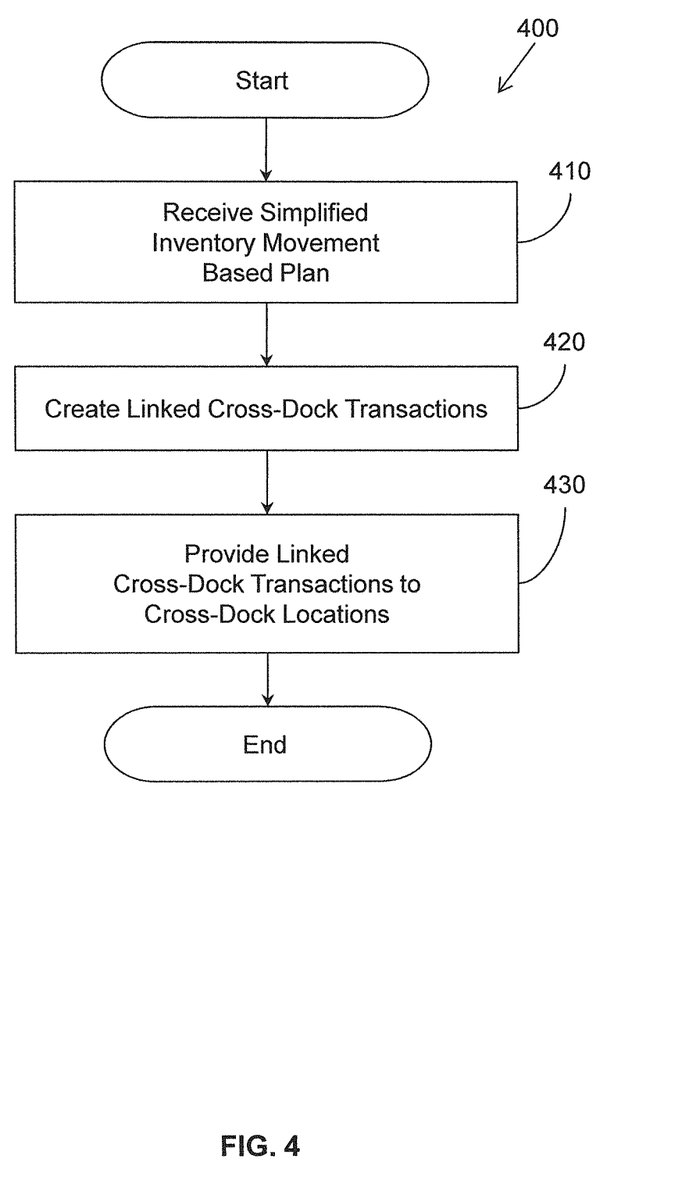
FIG. 4 illustrates another example embodiment of a method of performing inventory planning using a simplified inventory movement.

FIG. 4 illustrates an example embodiment of a method 400 that expands a simplified inventory movement into a set of linked transactions. The method 400 may be performed by the expansion logic 130 of FIG. 1. An example of the method is illustrated in FIG. 6. The method includes, at 410, receiving a simplified inventory movement based plan. At 420, the method includes creating a set of linked transactions where a first transaction corresponds to a first shipment of the quantity of items from the source to cross-dock location and a second transaction corresponds to a second shipment of the quantity of items from the cross-dock location to the destination. At 430, the method includes providing the set of linked transactions to the cross-dock location. The linking between the first and second transactions causes the cross-dock location to satisfy the quantity of items for the second shipment from the first shipment, preventing unnecessary handling.

FIG. 5 illustrates an example of how the simplified inventory movement is constructed. The simplified inventory movement may be created by the SIM logic 110 of FIG. 1 or the method 200 of FIG. 2. FIG. 5 illustrates how the warehouse lead time impacts the total lead time and receipt plan for the final destination, in this case a store. The supply chain has a source, one intermediate warehouse that is cross-docked, and a store. The route for items can be broken into two legs: leg 1 from source to warehouse and leg 2 from warehouse to store. These two legs can be seen shown separately below the chart. Leg 1 has a lead time of 3, which is the lead time into the warehouse from the source. Leg 2 has a lead time of 2 which is the aggregation of 1 day processing time and 1 day lead time into the store. The simplified inventory movement is constructed as source—store with a 5 day lead time.

The final line of the chart is the receipt plan for the store that is based on the simplified inventory movement. The first day the store can plan a receipt is day 6. This is the result of the warehouse having the first opportunity to plan a receipt on day 4 (a receipt on day 1 is not possible because the lead time indicates the order had to be released 3 days ago). There is 1 day processing time so the receipt will become available to ship on day 5. The first store opportunity to receive a shipment that leaves on or after the $5^{th}$ is the $6^{th}$—one day later. The receipt plan shows a lead time of 5 on day 6 because the receipt that will contain the inventory arrives at the warehouse on day 3—that is 2 days of lead time—and the lead time into the warehouse is another 3 days—giving a total of 5 days lead time The maximum holding time indicates the warehouse can hold the inventory through day 6. Therefore day 6 is also a valid ship opportunity and the store can receive the shipment on day 7. A receipt at the warehouse on day 7 is not available to ship to the store until day 8—which would arrive on day 9—therefore day 8 is not a valid receipt opportunity at the store. The receipt plan of FIG. 5 is for the store, and does not include receipts at the warehouse, simplifying the planning process.

FIG. 6 illustrates an example of how the distribution planning process plans using simplified inventory movements and also how the simplified inventory movement can be broken down into its component transactions. The example in FIG. 6 illustrates how one embodiment of the planning logic 120 and the expansion logic 130 function and also an example embodiment of method 300 of FIGS. 3 and 400 of FIG. 4. The multi-level route includes a first leg from the vendor V to the Warehouse W a parallel second legs from the warehouse W to the stores S1 and S2. S1 has a demand quantity of 5 and S2 has a demand quantity of 7. This means the distribution planning system will plan a shipment of 12 items from V to W, and shipments of 5 items to S1 and 7 items to S2.

The distribution system will represent the multi-level movement from V through W to S1 as a simplified inventory movement from V to S1 with lead time 3. The distribution system will represent the multi-level movement from V through W to S2 as a simplified inventory movement from V to S2 with lead time 3. At the point the initial inventory movement from V to W is shared (or released) to the source, all downstream inventory movements required to get the inventory to the final destinations in the desired quantities are also released.

There are two implications of this release timing. As can be seen in the chart of FIG. 6, in traditional distribution planning, each downstream inventory movement is normally only released on its lead-time. In this scenario, all downstream movements are released at the time the originating inventory movement is released (note that the inventory is released on Tuesday from W to S1 and S2 when the inventory movement from V to W is released). This means transactions are being released earlier than they would otherwise be released. The quantities of inventory delivered by the originating source cannot be re-planned or re-distributed further down the supply chain by the distribution system because they have been released. Therefore the final destinations should receive what they asked for (not withstanding unforeseen operational events).

When the transactions for the originating and downstream movements are released, the transaction for each outbound movement from a warehouse (excluding the originating source) must be linked to the transaction representing the inbound movement. It is this linking (along with the appropriate document type) that lets the execution systems know that the outbound movements can be directly satisfied by the inbound delivery and not from current inventory. FIG. 6 illustrates how TX1 for the inventory movement for the leg from W to S1 and TX2 for the leg from W to S2 are both linked to PO1 (Purchase Order 1), which is the transaction for the leg from V to W. Both transfers from warehouse to store are linked to the PO—indicating to the warehouse that they should be satisfied from the PO and not current inventory. In one embodiment, two documents similar to the example documents below would be provided to the warehouse W in FIG. 6. The first document is for the inventory bound for S1 and the second document is for the inventory bound for S2.

| Field | Value |
| --- | --- |
| Warehouse ID | Wxxx |
| Allocation date | <Thursday's Date> |
| SKU | 1234 |
| Location ID | S1 |
| Location Type | 'S' |
| Purchase Order ID | PO1 |
| Qty | 5 |

| Field | Value |
| --- | --- |
| Warehouse ID | Wxxx |
| Allocation date | <Thursday's Date> |
| SKU | 1234 |
| Location ID | S2 |
| Location Type | 'S' |
| Purchase Order ID | PO1 |
| Qty | 7 |

If the vendor was pre-packaging and marking the inventory, when PO1 is communicated on Tuesday the details of TX1 and TX2 would be shared. The details of TX1 and TX2 are communicated to the warehouse including the fact that the inventory is arriving in a pre-packaged and marked state so that the warehouse understands that the inventory can be cross-docked.

The systems and methods described herein permit a distribution planning solution to plan time-phased inventory movements from source to destination as a single movement without concern for the intermediate cross-dock locations through which the inventory moves or the time it takes to do so. This makes planning more efficient as there are significantly fewer inventory movements to plan and there is no need to earmark inventory in the cross-dock location so that a distribution planning solution does not see the inventory as being available for allocation.

Computer Embodiment

Figure 7:
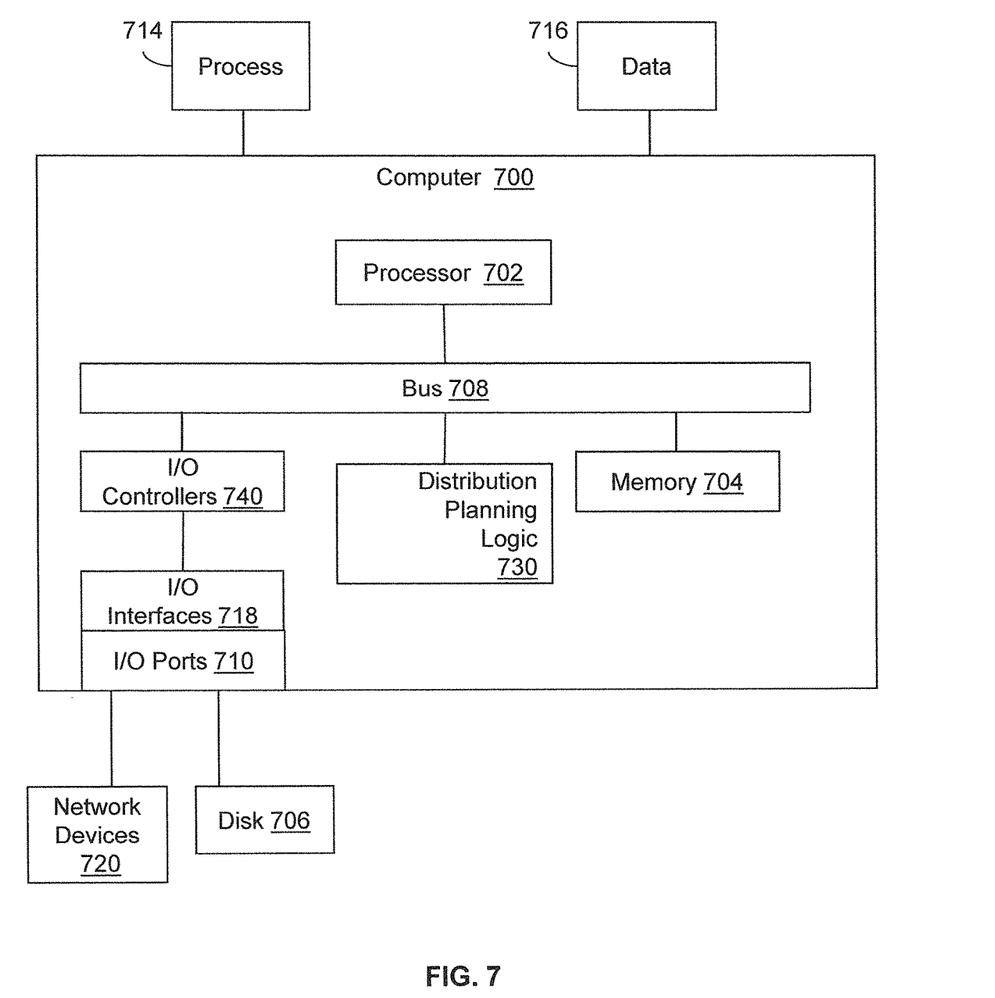
FIG. 7 illustrates an example embodiment of a computing system configured with the example systems and/or methods disclosed.

FIG. 7 illustrates an example computing device that is configured and/or programmed with one or more of the example systems and methods described herein, and/or equivalents. The example computing device may be a computer 700 that includes a processor 702, a memory 704, and input/output ports 710 operably connected by a bus 708. In one example, the computer 700 may include distribution planning logic 730 configured to facilitate planning using simplified inventory movements similar to the distribution planning logic 100 of FIG. 1 and the methods 200, 300, and 400 of FIGS. 2, 3, and 4, respectively. In different examples, the distribution planning logic 730 may be implemented in hardware, a non-transitory computer-readable medium or computer storage medium with stored instructions, firmware, and/or combinations thereof. While the distribution planning logic 730 is illustrated as a hardware component attached to the bus 708, it is to be appreciated that in one example, the distribution planning logic 730 could be implemented in the processor 702.

In one embodiment, the distribution planning logic 730 or the computer is a means (e.g., hardware, non-transitory computer-readable medium or computer storage medium, firmware) for creating a simplified inventory movement, planning using a simplified inventory movement, and/or expanding a simplified inventory movement into linked transactions.

The means may be implemented, for example, as an ASIC programmed to create a simplified inventory movement, plan using a simplified inventory movement, and/or expand a simplified inventory movement into linked transactions. The means may also be implemented as stored computer executable instructions that are presented to computer 700 as data 716 that are temporarily stored in memory 704 and then executed by processor 702.

The distribution planning logic 730 may also provide means (e.g., hardware, non-transitory computer-readable medium or computer storage medium that stores executable instructions, firmware) for performing the methods 200, 300, and 400 of FIGS. 2, 3, and 4, respectively.

Generally describing an example configuration of the computer 700, the processor 702 may be a variety of various processors including dual microprocessor and other multi-processor architectures. A memory 704 may include volatile memory and/or non-volatile memory. Non-volatile memory may include, for example, ROM, PROM, and so on. Volatile memory may include, for example, RAM, SRAM, DRAM, and so on.

A storage disk 706 may be operably connected to the computer 700 via, for example, an input/output interface (e.g., card, device) 718 and an input/output port 710. The disk 706 may be, for example, a magnetic disk drive, a solid state disk drive, a floppy disk drive, a tape drive, a Zip drive, a flash memory card, a memory stick, and so on. Furthermore, the disk 706 may be a CD-ROM drive, a CD-R drive, a CD-RW drive, a DVD ROM, and so on. The memory 704 can store a process 714 and/or a data 716, for example. The disk 706 and/or the memory 704 can store an operating system that controls and allocates resources of the computer 700.

The computer 700 may interact with input/output devices via the i/o interfaces 718 and the input/output ports 710. Input/output devices may be, for example, a keyboard, a microphone, a pointing and selection device, cameras, video cards, displays, the disk 706, the network devices 720, and so on. The input/output ports 710 may include, for example, serial ports, parallel ports, and USB ports.

The computer 700 can operate in a network environment and thus may be connected to the network devices 720 via the i/o interfaces 718, and/or the i/o ports 710. Through the network devices 720, the computer 700 may interact with a network. Through the network, the computer 700 may be logically connected to remote computers. Networks with which the computer 700 may interact include, but are not limited to, a LAN, a WAN, and other networks.

In another embodiment, the described methods and/or their equivalents may be implemented with computer executable instructions. Thus, in one embodiment, a non-transitory computer storage medium is configured with stored computer executable instructions that when executed by a machine (e.g., processor, computer, and so on) cause the machine (and/or associated components) to perform the instructions outlined with reference to the methods 200, 300, and 400 of FIGS. 2, 3, and 4, respectively.

While for purposes of simplicity of explanation, the illustrated methodologies in the figures are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional blocks that are not illustrated. The methods described herein are limited to statutory subject matter under 35 U.S.C. §101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable medium", as used herein, is a non-transitory medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read. Computer-readable medium described herein is limited to statutory subject matter under 35 U.S.C. §101.

"Computer storage medium", as used herein, is a non-transitory medium that stores instructions and/or data. A computer storage medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer storage medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read. Computer storage medium described herein is limited to statutory subject matter under 35 U.S.C. §101.

"Logic", as used herein, includes a computer or electrical hardware component(s), firmware, a non-transitory computer readable medium or computer storage medium that stores instructions, and/or combinations of these components configured to perform a function(s) or an action(s), and/or to cause a function or action from another logic, method, and/or system. Logic may include a microprocessor controlled by an algorithm, a discrete logic (e.g., ASIC), an analog circuit, a digital circuit, a programmed logic device, a memory device containing instructions that when executed perform an algorithm, and so on. Logic may include one or more gates, combinations of gates, or other circuit components. Where multiple logics are described, it may be possible to incorporate the multiple logics into one physical logic component. Similarly, where a single logic unit is described, it may be possible to distribute that single logic unit between multiple physical logic components. Logic as described herein is limited to statutory subject matter under 35 U.S.C. §101.

"User", as used herein, includes but is not limited to one or more persons, computers or other devices, or combinations of these.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims, which satisfy the statutory subject matter requirements of 35 U.S.C. §101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

To the extent that the phrase "one or more of, A, B, and C" is used herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be used.

What is claimed is:

1. A non-transitory computer storage medium storing computer-executable instructions that when executed by at least a processor of a computing system cause the processor to implement:
   a multi-level distribution planning logic comprising:
      a revised inventory movement logic configured to:
         receive an inventory allocation identifying a quantity of items for distribution;
         identify a first inventory movement for a first portion of the quantity of items from a source to a first destination, wherein the first inventory movement is a part of a multi-level route in electronic form that includes at least one cross-dock location between the source and the first destination;
         identify a second inventory movement for a second portion of the quantity of items from the source to a second destination, wherein the second inventory movement is a part of the multi-level route in electronic form that includes the at least one cross-dock location between the source and the second destination, wherein the first inventory movement and the second inventory movement define linked transactions that correspond to legs of the multi-level route through which the quantity of items moves from the source to the respective destinations;
         determine the legs of the multi-level route, comprising:

determining a first leg, from the source to the at least one cross-dock location, that is shared between the first portion of the quantity of items and the second portion of the quantity of items;

determining a second leg corresponding to movement of the first portion of the quantity of items from the at least one cross-dock location to the first destination; and determining a third leg corresponding to movement of the second portion of the quantity of items from the at least one cross-dock location to the second destination, wherein the cross-dock location has an associated cross-dock delay time, the first destination has an associated first destination delay time and the second destination has an associated second destination delay time;

construct a revised first inventory movement in electronic form that represents the part of the multi-level route corresponding to the first portion of the quantity of items as a first single level route between the source and the first destination without the at least one cross-dock location, wherein the first single level route is constructed with an associated first lead time that corresponds to a sum of the cross-dock delay time and the first destination delay time; and construct a revised second inventory movement in electronic form that represents the part of the multi-level route corresponding to the second portion of the quantity of items as a second single level route between the source and the second destination without the at least one cross-dock location, wherein the second single level route is constructed with an associated second lead time that corresponds to a sum of the cross-dock delay time and the second destination delay time;

a planning logic configured to:
 obtain the revised first inventory movement and the revised second inventory movement as one or more electronic documents from the revised inventory movement logic; and
 construct a revised inventory movement plan for the first portion of the quantity of items and the second portion of the quantity of items based upon the revised first inventory movement and the revised second inventory movement; and an expansion logic configured to:
 obtain the revised inventory movement plan from the planning logic;
 expand the revised first inventory movement to the first leg and the second leg;
 expand the revised second inventory movement to the first leg and the third leg;
 create a set of electronically linked transactions based upon the expanding the revised first inventory movement and the expanding the revised second inventory movement; and
 provide, via a network, the set of electronically linked transactions to the at least one cross-dock location.

2. The non-transitory computer storage medium of claim 1, where the instructions for constructing the revised first inventory movement include instructions that when executed by the processor cause the processor to aggregate a cross-dock lead time, a cross-dock processing time, and a destination lead time to calculate the first lead time.

3. The non-transitory computer storage medium of claim 1, where the instructions for constructing the revised first inventory movement include instructions that when executed by the processor cause the processor to retrieve, from a storage device, a stored revised inventory movement mapped to the source, the cross-dock location, and the first destination.

4. The non-transitory computer storage medium of claim 1, where the instructions for receiving the inventory allocation include instructions that when executed by the processor cause the processor to retrieve, from a storage device, a stored revised inventory movement mapped to a stock keeping unit (SKU) for the items, the source, the cross-dock location, and the first destination.

5. The non-transitory computer storage medium of claim 1, where the cross-dock delay time includes a maximum hold time associated with the cross-dock location.

6. The non-transitory computer storage medium of claim 1, where the instructions further comprise instructions that when executed by the processor cause a computing device to release the quantity of items at the cross-dock location at the same time the quantity of items is released from the source.

7. The non-transitory computer storage medium of claim 1, where the planning logic is further configured to create a receipt plan for the cross-dock location that does not include the quantity of items to prevent the cross-dock location from unpacking the quantity of items when received.

8. The non-transitory computer storage medium of claim 1, where the expansion logic is further configured to:
 create a first transaction that corresponds to a first shipment of the first portion of the quantity of items from the source to the cross-dock location;
 create a second transaction that corresponds to a second shipment of the first portion of the quantity of items from the cross-dock location to the first destination; and
 link the first transaction to the second transaction such that, at the cross-dock location, the first portion of the quantity of items for the second shipment is satisfied from the first portion of the quantify of items from the first shipment.

9. The non-transitory computer storage medium of claim 1, where the first single level route is constructed with data that prevents the planning logic from altering the first portion of the quantity of items.

10. A computer implemented method performed by a computing system including at least one processor, the method comprising actions that implement:
 a multi-level distribution planning logic comprising:
  a revised inventory movement logic configured to perform:
   receiving an inventory allocation identifying a quantity of items for distribution;
   identifying from an electronic transaction, by the processor, a first inventory movement for a first portion of the quantity of items from a source to a first destination, wherein the first inventory movement is a part of a multi-level route that includes at least one cross-dock location between the source and the first destination;
   identifying a second inventory movement for a second portion of the quantity of items from the source to a second destination, wherein the second inventory movement is a part of the multi-level route that includes the at least one cross-dock location between the source and the second destination, wherein the first inventory movement and the second inventory movement define linked transactions that correspond to legs of the multi-level route through which the quantity of items moves from the source to the respective destinations;

determining the legs of the multi-level route, comprising:
  determining a first leg, from the source to the at least one cross-dock location, that is shared between the first portion of the quantity of items and the second portion of the quantity of items;
  determining a second leg corresponding to movement of the first portion of the quantity of items from the at least one cross-dock location to the first destination; and
  determining a third leg corresponding to movement of the second portion of the quantity of items from the at least one cross-dock location to the second destination, wherein the cross-dock location has an associated cross-dock delay time, the first destination has an associated first destination delay time and the second destination has an associated second destination delay time;

constructing, by at least the processor, a revised first inventory movement as an electronic document that represents the part of the multi-level route corresponding to the first portion of the quantity of items as a first single level route between the source and the first destination without the at least one cross-dock location, wherein the first single level route is constructed with an associated first lead time, wherein the first lead time corresponds to a sum of the cross-dock delay time and the first destination delay time; and constructing, by at least the processor, a revised second inventory movement as an electronic document that represents the part of the multi-level route corresponding to the second portion of the quantity of items as a second single level route between the source and the second destination without the at least one cross-dock location, wherein the second single level route is constructed with an associated second lead time, wherein the second lead time corresponds to a sum of the cross-dock delay time and the second destination delay time; and a planning logic configured to perform:
  obtaining, by at least the processor, the revised first inventory movement and the revised second inventory movement from the revised inventory movement logic; and
  constructing a revised inventory movement plan for the first portion of the quantity of items and the second portion of the quantity of items based upon the revised first inventory movement and the revised second inventory movement; and
  providing, via a network, the revised inventory movement plan to a distribution planning process.

11. The method of claim 10, wherein constructing the revised first inventory movement includes aggregating a cross-dock lead time, a cross-dock processing time, and a destination lead time to calculate the first lead time for the first single level route.

12. The method of claim 10, wherein receiving the inventory allocation includes retrieving, from a storage device, a stored revised inventory movement mapped to the source, the cross-dock location, and the first destination.

13. The method of claim 10, wherein the cross-dock delay time is determined by including a maximum hold time associated with the cross-dock location.

14. The method of claim 10, the planning logic configured to perform creating, by the processor, a receipt plan for the cross-dock location that does not include the quantity of items to prevent the cross-dock location from unpacking the quantity of items when received.

15. The method of claim 10, further comprising actions that implement an expansion logic configured to perform:
  creating a first transaction that corresponds to a first shipment of the first portion of the quantity of items from the source to the cross-dock location;
  creating a second transaction that corresponds to a second shipment of the first portion of the quantity of items from the cross-dock location to the first destination; and
  linking the first transaction to the second transaction such that, at the cross-dock location, the first portion of the quantity of items for the second shipment is satisfied from the first shipment.

16. A computing system comprising:
  a memory;
  at least one processor connected to the memory; and
  a non-transitory computer storage medium connected with the at least one processor and the memory, the non-transitory computer storage medium storing computer-executable instructions that when executed by at least the processor cause the processor to implement:
    a multi-level distribution planning logic comprising:
      a revised inventory movement logic configured to:
        receive an inventory allocation identifying a quantity of items for distribution;
        identify an inventory movement for the quantity of items from a source to a destination wherein the inventory movement is a multi-level route in electronic form that includes at least one cross-dock location between the source and the destination, wherein the inventory movement defines linked transactions that correspond to legs of the multi-level route through which the quantity of items moves from the source to the destination, where the cross-dock location has an associated cross-dock delay time and the destination has an associated destination delay time;
        determine the legs of the multi-level route, comprising:
          determining a first leg corresponding to movement of the quantity of items from the source to the at least one cross-dock location; and
          determining a second leg corresponding to movement of the quantity of items from the at least one cross-dock location to the destination; and
        construct a revised inventory movement as an electronic document that represents the multi-level route as a single level route between the source and the destination without the at least one cross-dock location, wherein the single level route is constructed with an associated lead time that corresponds to a sum of the cross-dock delay time and the destination delay time; and
    a planning logic configured to:
      obtain the revised inventory movement from the revised inventory movement logic;

construct a revised inventory movement plan for the quantity of items based upon the revised inventory movement; and provide, via a network, the revised inventory movement plan to a distribution planning process.

17. The computing system of claim 16, wherein the instructions for constructing the revised inventory movement include instructions that when executed by the processor cause the processor to aggregate a cross-dock lead time, a cross-dock processing time, and a destination lead time to calculate the lead time.

18. The computing system of claim 16, where the instructions for constructing the revised inventory movement include instructions that when executed by the processor cause the processor to retrieve, from a storage device, a stored revised inventory movement mapped to the source, the cross-dock location, and the destination.

19. The computing system of claim 16, where the instructions for constructing the revised inventory movement include instructions that when executed by the processor cause the processor to retrieve, from a storage device, a stored revised inventory movement mapped to a stock keeping unit (SKU) for the items, the source, the cross-dock location, and the destination.

* * * * *

UNITED STATES PATENT AND TRADEMARK OFFICE
CERTIFICATE OF CORRECTION

PATENT NO. : 9,704,125 B2
APPLICATION NO. : 14/105384
DATED : July 11, 2017
INVENTOR(S) : Ireland et al.

It is certified that error appears in the above-identified patent and that said Letters Patent is hereby corrected as shown below:

In the Specification

In Column 5, Line 67, after "time" insert -- . --.

In the Claims

In Column 12, Line 39, in Claim 8, delete "quantify" and insert -- quantity --, therefor.

Signed and Sealed this
Thirteenth Day of February, 2018

Andrei Iancu
*Director of the United States Patent and Trademark Office*